(12) United States Patent
Reichenbach et al.

(10) Patent No.: US 7,510,120 B2
(45) Date of Patent: Mar. 31, 2009

(54) CODE READER

(75) Inventors: Jürgen Reichenbach, Emmendingen (DE); Wolfram Runge, Freiburg (DE); Helmut Weber, Emmendingen (DE)

(73) Assignee: Sick AG, Waldkirch (DE)

( * ) Notice: Subject to any disclaimer, the term of this patent is extended or adjusted under 35 U.S.C. 154(b) by 472 days.

(21) Appl. No.: 11/339,382

(22) Filed: Jan. 25, 2006

(65) Prior Publication Data

US 2006/0175409 A1 Aug. 10, 2006

(30) Foreign Application Priority Data

Feb. 7, 2005 (DE) ............... 10 2005 005 536

(51) Int. Cl.
*G06K 7/10* (2006.01)

(52) U.S. Cl. .............. 235/462.42; 235/462.01; 235/462.11; 235/454

(58) Field of Classification Search ........... 235/462.42, 235/462.43, 462.01, 462.11, 454
See application file for complete search history.

(56) References Cited

U.S. PATENT DOCUMENTS

| | | | | |
|---|---|---|---|---|
| 5,477,044 A * | 12/1995 | Aragon | ............... | 235/472.01 |
| 5,786,586 A * | 7/1998 | Pidhirny et al. | ........ | 235/472.01 |
| 5,825,011 A * | 10/1998 | Suzuki et al. | .......... | 235/472.01 |
| 6,105,869 A * | 8/2000 | Scharf et al. | ................ | 235/454 |
| 6,247,645 B1 | 6/2001 | Harris et al. | | |
| 6,595,422 B1 * | 7/2003 | Doljack | ................ | 235/462.42 |
| 6,824,061 B1 | 11/2004 | Hattersley et al. | | |
| 7,017,817 B2 * | 3/2006 | Ito et al. | ................ | 235/462.42 |
| 2002/0000472 A1 | 1/2002 | Hattersley et al. | | |
| 2004/0173681 A1 * | 9/2004 | Toyama et al. | ............... | 235/454 |
| 2005/0087601 A1 * | 4/2005 | Gerst et al. | ................. | 235/455 |
| 2006/0133757 A1 * | 6/2006 | Nunnink | ..................... | 385/133 |

FOREIGN PATENT DOCUMENTS

| | | |
|---|---|---|
| WO | WO 99/49347 | 9/1999 |
| WO | WO 02/075637 | 9/2002 |
| WO | WO 2005/008565 A1 | 1/2005 |

\* cited by examiner

*Primary Examiner*—Ahshik Kim
(74) *Attorney, Agent, or Firm*—Harness, Dickey & Pierce, P.L.C.

(57) ABSTRACT

A code reader comprising an integrated light source for the illumination of a reading region, a sensor matrix and an optical receiving system positioned in front of the latter, wherein the light emergence surface of the light source is located in or closely in front of the depth of field zone of the optical receiving system.

19 Claims, 4 Drawing Sheets

CODE READER

CROSS-REFERENCE TO RELATED APPLICATIONS

This application claims the benefit of German Patent Application No. 10 2005 005 536.2, filed on Feb. 7, 2005. The disclosure of the above application is incorporated herein by reference.

FIELD AND BACKGROUND OF THE INVENTION

The invention relates to a code reader having an integrated light source for the illumination of a reading zone and having a sensor matrix and an optical receiving system positioned in front of said sensor matrix.

Code readers are known in a variety of embodiments from the prior art and are also used inter alia to read codes which were applied directly to the respective carrier material by a deformation thereof. Codes of this type, which are known, for example, as so-called DPM codes (direct part marking codes), are generated, for example, in that the carrier material is acted on by a high-energy laser or by means of pin stamping ("dot peening"). It is common to both methods that recesses or indentations are generated in the carrier material at the respective desired positions which then ultimately correspond to the desired code in their total arrangement.

DPM codes are in particular used for two-dimensional codes which consist, for example, of dots directly arranged inside an area, with each dot corresponding to a recess or indentation in the carrier material.

The reading of DPM codes is difficult when the code reader is arranged perpendicular above the code, since the light source integrated in the code reader then illuminates the code at an angle of incidence which coincides at least largely with the optical axis of the code reader, which has the consequence that no great contrast difference occurs between the regions of the carrier material provided with recesses and those regions which do not have any recesses. Accordingly, one usually does not work with a light source integrated in the code reader here, but rather with an external light source which has to be provided separately and which illuminates the code at a very oblique angle of incidence in the sense of dark field illumination. Those regions of the carrier material having no recesses in this case generate a very flat light reflection so that the reflected light does not reach the code reader and the said regions in the code reader ultimately appear dark. The light obliquely incident onto the recesses is, in contrast, reflected to the code reader to a sufficient degree with an oblique light incidence such that the recesses ultimately appear light in the code reader and can be clearly distinguished from those regions—which appear dark—which have no recesses.

The fact is thus disadvantageous in the described known arrangements for the reading of DPM codes that the integrated light source usually present in a code reader cannot be used and an external light source additionally has to be provided which provides the described oblique illumination of the code. This external light source must furthermore be correctly adjusted relative to the code reader which signifies an additional effort.

SUMMARY OF THE INVENTION

It is an object of the invention to further develop a code reader of the initially named kind such that it is also suitable for the reading of DPM codes without the provision of a light source separate from the code reader, with the respective code in particular being able to be recognized with the greatest possible reliability.

This object is satisfied in accordance with the invention and in particular in that the light emergence surface of the light source integrated in the code reader is located in the depth of field zone or closely in front of the depth of field zone of the optical receiving system of the code reader.

In code readers known from the prior art, the light emergence surface is as a rule located approximately in the region of the optical receiving system of the code reader and not in its depth of field zone comparatively far away from the optical receiving system. A known arrangement of the light emergence surface of this type in the region of the optical receiving system accordingly also always results in an illumination of the code to be read at an angle of incidence which substantially coincides with the optical axis of the optical receiving system. In accordance with the invention, a code reader of this type is now modified such that the light emergence surface is arranged further away from the optical receiving system, namely in the region of the depth of field zone, specifically as a rule somewhat in front of the depth of field zone, which ultimately means that the light emergence surface is located very closely to the code to be read since the code also has to be arranged in the depth of field zone of the optical receiving system to be able to ensure a correct reading thereof. It then becomes possible in accordance with the invention, due to the spatial proximity between the light emergence surface and the code, to illuminate the code at a very oblique angle of incidence such that radiation reflected from such regions of the carrier material not having any recesses does not reach the optical receiving system. Only those radiation proportions reach the optical receiving system in a desired manner which are reflected by the recesses so that the code can be recognized perfectly. The angle between the optical axis of the optical receiving system and the light rays incident onto the code sensibly amounts to between 70° and 95°, in particular to between 80° and 85°.

In accordance with the invention, the provision of a separate light source is therefore avoided in an advantageous manner, which reduces the total economic effort of the arrangement and additionally also saves adjustment procedures between the light source and the code reader necessary in accordance with the prior art. In accordance with the invention, a compact device is made available which is to be accommodated in a single housing, is easy to handle and is suitable to read DPM codes without problem without the need for any additional components. This is achieved in that the light emergence surface of the light source integrated in the code reader is located much closer to the depth of field zone of the optical receiving system than to the optical receiving system itself.

It is preferred for the light emergence surface to extend substantially parallel to the optical axis of the optical receiving system. With an alignment of the light emergence surface of this type, light radiation extending obliquely to the surface of the code can be generated particularly effectively. The light emergence surface can also extend at an inclination with respect to the optical axis of the optical receiving system; however, it is advantageous in every case for the light emergence surface not to extend perpendicular to the optical axis of the optical receiving system since is it admittedly not impossible in the latter case to realize the desired oblique irradiation of the light originating from the light source of the code reader, but it would nevertheless be difficult.

It is particularly advantageous for an attachment having the light emergence surface to be provided which can be detached from the remaining code reader components. In this case, conventional code readers in accordance with the prior art can then be modified or retrofitted in accordance with the invention in that they are provided with an attachment of the named type which ensures in a suitable manner that light emerges from the light emergence surface located in the attachment and is then ultimately incident onto the code to be read.

In a preferred embodiment of the invention, the light source is located in the region of the optical receiving system and/or of the sensor matrix, with light directing elements being arranged between the light source and the light emergence surface. It is then possible in this case, for example, again to use conventional code readers in accordance with the prior art and also to use the light source integrated in code readers of this type. The light sources are namely as a rule arranged in the region of the optical receiving system and/or in the region of the sensor matrix in code readers in accordance with the prior art so that the named light directing elements can be positioned such that they direct the light radiated from the existing light source to the light emergence surface provided in accordance with the invention. The provision of an additional light source to the light source already present in a code reader in accordance with the prior art is accordingly no longer necessary. This embodiment can be realized particularly advantageously if the light directing elements and the light emergence surface are accommodated in an attachment detachable from the remaining code reader components. This attachment, which then only has reflecting surfaces and a light emergence surface designed, for example, as a light transmitting plate, can be manufactured in a cost-favorable manner and can be coupled in a simple manner to code readers in accordance with the prior art. A code reader in accordance with the invention can thus be realized with a very low economic effort.

The light directing elements mentioned above are preferably made as optical waveguides and/or as an arrangement of reflecting surfaces.

The light source used in accordance with the invention can consist of an arrangement of a plurality of LEDs which are arranged around the optical axis of the optical receiving system, in particular in ring shape around the optical axis of the optical receiving system. When the radiation transmitted by these LEDs is then directed in a suitable manner to the light emergence surface, for example via light waveguides or reflecting surfaces, a ring-shaped, oblique radiation of the code to be read can be achieved in which the code is illuminated from practically all directions.

In particular when light waveguides are used, but also when reflecting elements are used as light directing elements, it is preferred for lenses and/or diaphragms and/or ring reflectors for the generation of radiation directed in the direction of the light directing elements to be associated with the LEDs. In this process, a separate lens and/or a separate diaphragm and/or a separate ring reflector can in particular be associated with each LED. In this manner, the light radiation can be guided directly, efficiently and with little loss to the light emergence surface provided in accordance with the invention.

In a further embodiment of the invention, the light source, which in particular consists of an arrangement of a plurality of LEDs, including the light emergence surface, can be located in or close to the depth of field zone of the optical receiving system. If an arrangement of this type should be used in combination with code readers in accordance with the prior art which already have an integrated light source, the light source already present in the code reader can be deactivated since the light source present in the depth of field zone of the optical receiving system provides the desired oblique illumination of codes to be read.

In the same manner, both light sources can, however, also be activated alternately or together in order thus to generated different contrast situations which then ultimately make possible an even more reliable recognition of a code by a comparison of the images taken with different contrast situations.

Even when the light source is provided in the depth of field zone of the optical receiving system, the light source can be provided together with the light emergence surface associated with it in an attachment detachable from the remaining code reader components, which in turn simplifies use with a code reader in accordance with the prior art.

It is particularly preferred for the light source and the optical receiving system to be accommodated in an optical head which is adjustable together with the light emergence surface positioned in accordance with the invention in different positions relative to the remaining code reader components. In this manner, a correspondingly made code reader can, for example, selectively work with front-side light emergence or lateral light emergence and can thus be adapted to the respective conditions of use. The optical head with light source and optical receiving system then forms, together with the light emergence surface provided in accordance with the invention and the optionally provided light directing elements, a unit which can be positioned in the respectively required manner relative to the remaining code reader components.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4b illustrates a code reader in accordance with FIG. 4a in which the position of the optical head has been changed with respect to FIG. 4a;

DETAILED DESCRIPTION OF THE PREFERRED EMBODIMENTS

The following description of the preferred embodiments is merely exemplary in nature and is in no way intended to limit the invention, its application, or uses.

Figure 1:
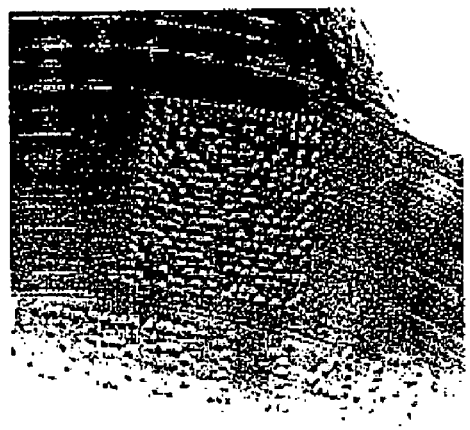
FIG. 1 illustrates an image of a DPM code taken with frontal illumination.

The code shown in FIG. 1 was introduced into a metal carrier by means of dot peening and consists of a square field of indentations arranged in a predetermined pattern, with each indentation having been produced by a needle impressed into the metal carrier. An arrangement of a plurality of numbers, likewise formed from individual indentations, are located beneath the square field.

The code in accordance with FIG. 1 cannot be recognized very easily since it was taken by a code reader with frontal illumination that is with a direction of illumination extending perpendicular to the carrier material.

Figure 2:
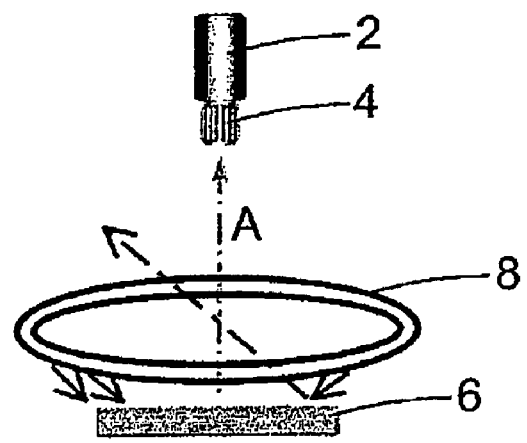
FIG. 2 illustrates an arrangement in accordance with the prior art for the reading of DPM codes.

FIG. 2 shows a schematic representation of an arrangement in accordance with the prior art which is suitable for an improved reading of DPM codes, that is, for example, also of a code in accordance with FIG. 1. This arrangement consists of a camera 2 with an integrated sensor matrix, with an optical receiving system 4 being positioned in front of the sensor matrix. An object 6 is provided beneath and in the field of view of the camera 2 and bears a DPM code on its surface facing the camera 2.

Furthermore, a ring-shaped illumination arrangement 8 is provided which is located a lot more closely to the object 6 than to the camera 2. The diameter of the illumination arrangement 8 is selected such that the light sources of the illumination arrangement 8 arranged in ring shape are not located perpendicularly above the code, but outside the code. The illumination arrangement 8 is thus suitable to illuminate the code located on the object 6 obliquely from above in the direction of the arrows draw in FIG. 2 so that light specularly reflected by the object 6 does not reach the optical receiving system 4 of the camera 2 (see chain-dotted arrow of FIG. 2).

Only that light proportion reflected by the indentations of the code reaches the optical receiving system 4 of the camera 2 in a substantial proportion along the arrow A so that the indentations can be recognized by the camera 2 without a problem.

Figure 3:
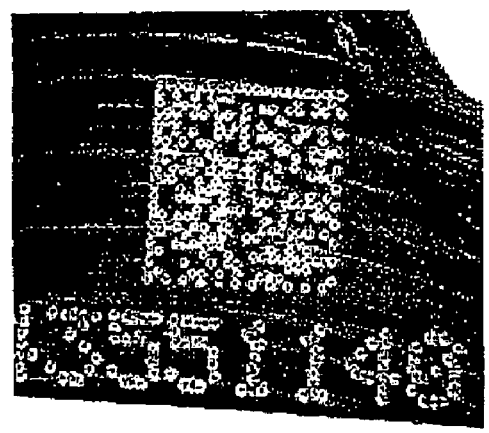
FIG. 3 illustrates the image of a code in accordance with FIG. 1, which was taken by an arrangement in accordance with FIG. 2.

A code in accordance with FIG. 1 taken by an arrangement in accordance with FIG. 2 can be seen from FIG. 3. FIG. 3 shows that the contrasts between the regions of the carrier material provided with indentations and those regions which have no indentations are much larger than the corresponding contrasts in accordance with FIG. 1.

As already explained above, it is however disadvantageous in the arrangement in accordance with FIG. 2 that a separate illumination arrangement 8 has to be provided which moreover has to be correctly adjusted relative to the camera 2.

Figure 4A:
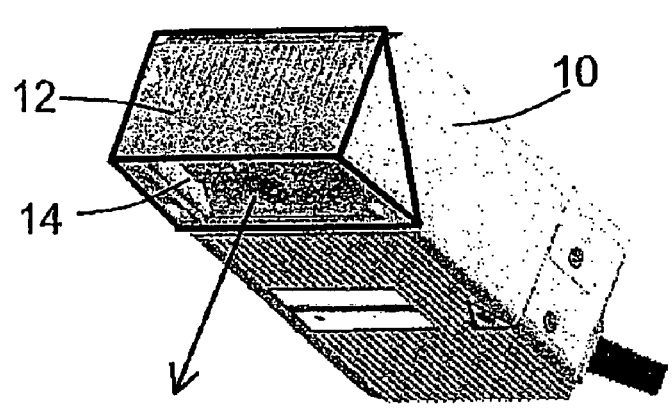
FIG. 4a illustrates a three-dimensional view of a code reader in accordance with the prior art with a detachable optical head.

FIG. 4a shows a code reader in a three-dimensional view which is used to read codes which have no recesses or indentations. A code reader 10 of this type has an optical head 12 in its end face region which has three rectangular side surfaces and two triangular end faces disposed opposite one another. One of the side surfaces is made as a light emergence surface 14.

A sensor matrix which has an optical receiving system positioned in front of it is located in the optical head 12. Individual LEDs which serve for the illumination of the code to be read are arranged around the optical receiving system as light sources.

On an orientation of the optical head 12 in accordance with FIG. 4a, the light generated by the LEDs exits in the direction of the arrow, that is laterally out of the code reader 10.

Figure 4B:
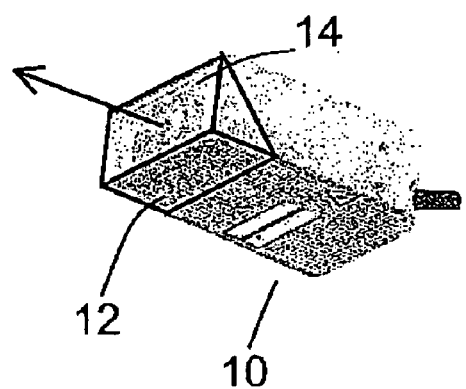

FIG. 4b, which shows the code reader 10 in accordance with FIG. 4a in a smaller representation, illustrates the fact that the optical head 12 can also be secured to the code reader 10 in an arrangement rotated with respect to FIG. 4a such that the light generated by the LEDs exits the code reader 10 at the end face, as is illustrated by the arrow drawn in FIG. 4b.

The code reader in accordance with FIGS. 4a and 4b can accordingly be used for different applications or installation situations by a suitable orientation of its optical head 12. The code reader 10 in accordance with FIGS. 4a and 4b can in particular be modified by the provision in accordance with the invention of an attachment to the optical head 12. An attachment of this type can be made, for example, in accordance with FIGS. 5 to 7.

Figure 5:
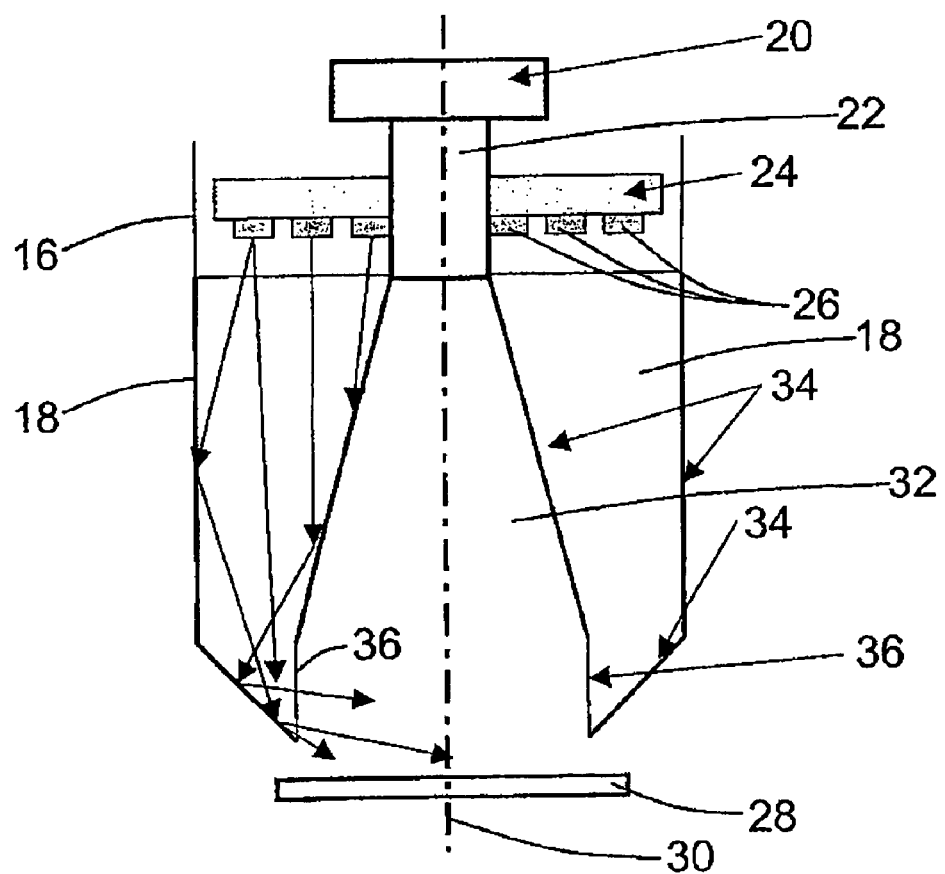
FIG. 5 illustrates a section through an arrangement in accordance with the invention with reflecting surfaces.

FIG. 5 shows a section through an optical head 16 and an attachment 18 secured thereto which serves for the realization of the principle in accordance with the invention.

The optical head 16 includes a sensor matrix 20 and an optical receiving system 22 designed as an objective and positioned in front of the sensor matrix 20. The optical receiving system 22 extends through a board 24 which carries a plurality of LEDs 26, arranged around the optical receiving system 22, on its lower side remote from the sensor matrix 20.

An object 28 onto which a DPM code has been applied is located in the fields of view of the sensor matrix 20 or the unit of sensor matrix 20 and optical receiving system 22. The optical head 16 can be terminated with a transmitting plate on its side facing the object 28.

The named attachment 18, which extends from the optical head 16 almost up to the object 28, is secured to the optical head 16. The attachment 18 surrounds a substantially ring-shaped hollow space which surrounds the optical axis 30 of the optical receiving system 22, with a central opening 32 being provided in the attachment 18 which becomes larger as the distance from the optical head 16 increases and which ensures that light coming from the object 28 or from the code arranged thereon can reach the optical receiving system 22 without impediment.

The inner surfaces 34 of the ring-shaped hollow space are made as specularly reflecting or at least as reflecting so that they are suitable to direct light coming from the LEDs 26 within the hollow space into its end region facing the object 28. This is illustrated by the light rays shown as arrows in accordance with FIG. 5 which are drawn in the left hand region of the hollow space.

In its lower end region, the attachment 18 has an annular light emergence surface 36 which does not extend perpendicularly above the code to be read, but outside or to the side thereof.

As FIG. 5 illustrates, the reflecting inner surfaces 34 of the attachment 18 are arranged such that the light coming from the LEDs 26 is ultimately directed into the region of the light emergence surface 36 where it emerges from the light emergence surface 36 extending parallel to the optical axis 30 of the optical receiving system 22 in an orientation oblique to the surface of the object 28 or of the code located thereon such that ultimately an illumination of the code takes place in accordance with the principle already explained in connection with FIG. 2.

The attachment 18 can represent a separate component which can be coupled to an optical head 12 in accordance with FIGS. 4a and 4b and which can be connected together with it in the respectively desired orientation with a code reader 10. It is particularly advantageous in this connection that an attachment 18 in accordance with FIG. 5 does not require any power supply and also does not make any intervention in the optical head 16 necessary so that it can be attached mechanically and can be connected to an optical head 16 in an extremely simple manner.

Figure 6:
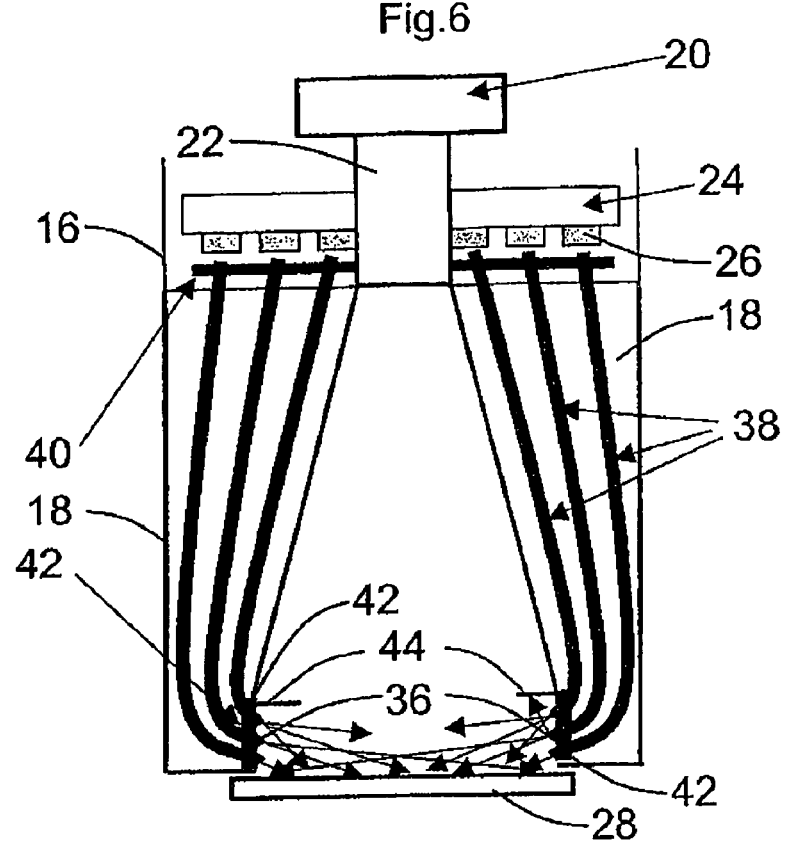
FIG. 6 illustrates a sectional representation of an arrangement in accordance with FIG. 5 in which the reflecting surfaces have been replaced by light waveguides.

FIG. 6 shows an arrangement corresponding in the design of the optical head 16 and the shape of the attachment 18 to FIG. 5 so that corresponding reference numerals are also used here.

The difference with respect to FIG. 5 consists of the fact that, instead of the reflecting inner surfaces 34, light waveguides 38 are provided which are held by a holding plate 40 in the end regions in the optical head 16. Specifically, a separate light waveguide 38 is provided for each LED 26 and ensures that the light from the respective LED 26 is directed into the region of the light emergence surface 36 such that the light guided in this manner can exit directly from the light waveguides 38 obliquely to the surface of the object 28 and thus provides an illumination which largely corresponds to that in accordance with FIG. 5. To provide the correct orientation of the light waveguides 38 in the region of the light emergence surface 36, a corresponding holding element 42, made for example in annular shape, is also present there and the ends of the light waveguides 38 are fixed in it.

A shadowing element 44 projects radially inwardly above the light emergence surface 36 and can e.g. have an annular shape and extends perpendicular to the optical axis of the optical receiving system 22. This shadowing element 44 serves to prevent light exiting from the ends of the light waveguides 38 from reaching the optical receiving system 22 directly and without reflection at the object 28.

Figure 7:
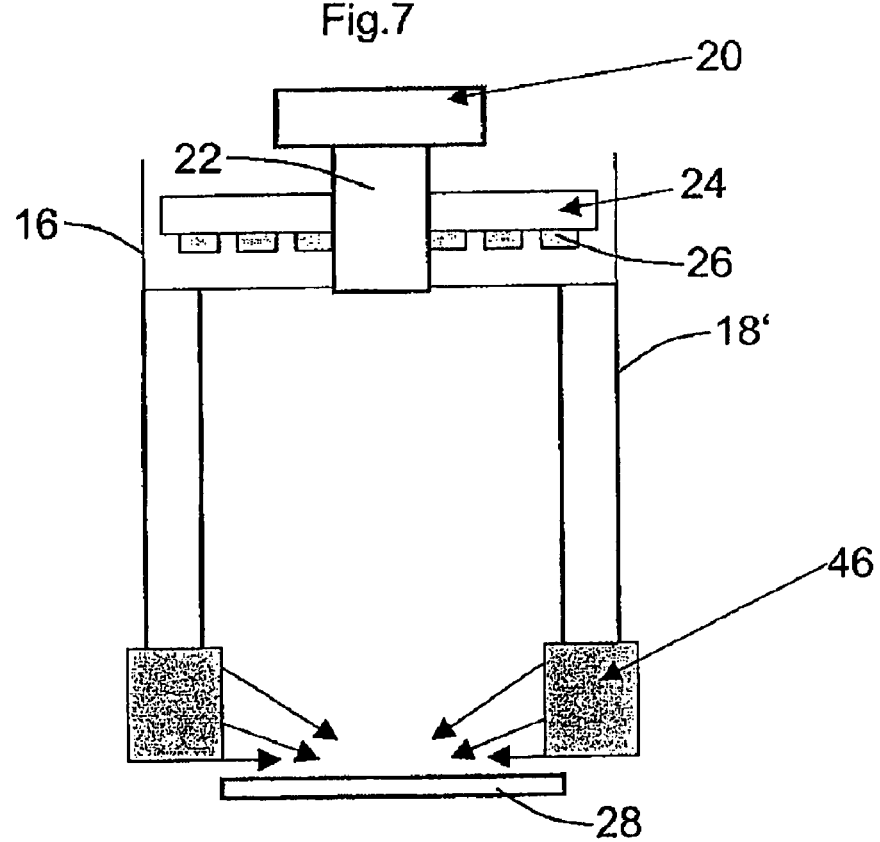
FIG. 7 illustrates a sectional representation of an arrangement in accordance with the invention with light sources provided in the depth of field zone of the optical receiving system.

The arrangement shown in FIG. 7 has an optical head 16 which is made identically to an optical head 16 in accordance with FIG. 5. This optical head 16 is coupled in accordance with FIG. 7 to an attachment 18' which like the attachments 18 in accordance with FIGS. 5 and 6 extends almost up to the object 28. The attachment 18' has substantially the shape of a circular cylinder and has an annular light source 46 at its lower end region facing the object 28 which is made such that light exiting it is obliquely incident onto the surface of the object 28. The light source 46 must be provided with voltage from the code reader via the optical head 16. It is alternatively also possible to provide a power source in the form of a battery or a rechargeable battery in the attachment 18'.

As already explained, an arrangement in accordance with FIG. 7 can be designed such that the light source 46 and the LEDs 26 can be activated alternately or also together.

Figure 8:
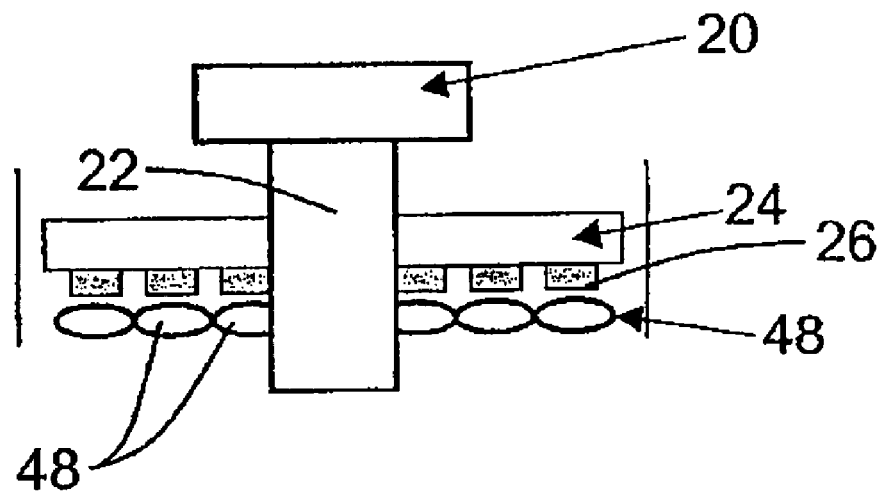
FIG. 8 illustrates an optical head usable In accordance with the invention with lenses arranged in front of the LEDs of the optical head.
Figure 9:
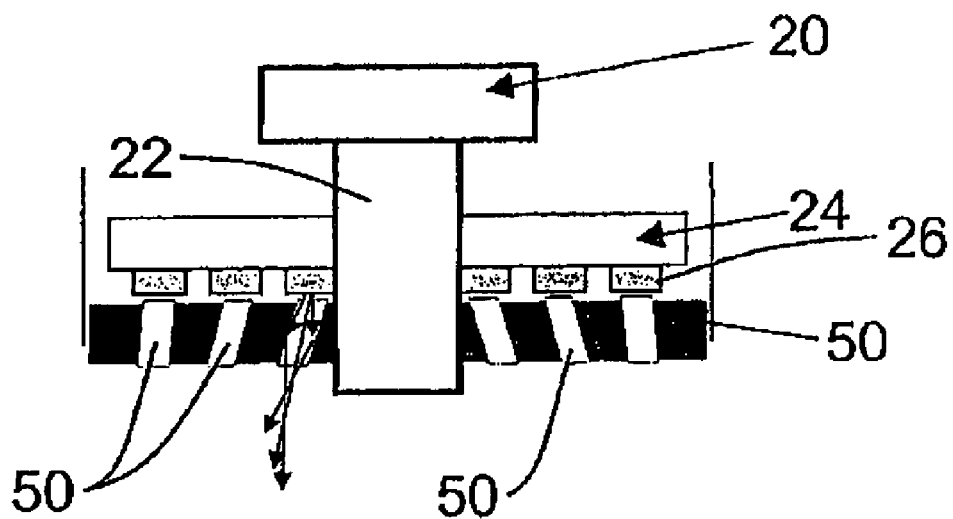
FIG. 9 illustrates an optical head usable In accordance with the invention with diaphragms arranged in front of the LEDs of the optical head.

FIGS. 8 and 9 each show an optical head 16 such as can be used in connection with arrangements in accordance with FIGS. 4 to 7.

The optical head in accordance with FIG. 8 is improved with respect to the optical head 16 of FIGS. 5 to 7 in that each LED 26 has its own lens 48 positioned in front of it which, starting from each LED 26, generates a directed radiation which can be guided, for example, particularly efficiently onto reflecting inner surfaces 34 of an attachment 18 in accordance with FIG. 5.

A corresponding effect can be achieved when the lenses 48 in accordance with FIG. 9 are replaced by diaphragms 50 or ring reflectors.

The description of the invention is merely exemplary in nature and, thus, variations that do not depart from the gist of the invention are intended to be within the scope of the invention. Such variations are not to be regarded as a departure from the spirit and scope of the invention.

REFERENCE NUMERAL LIST 2 camera
4 optical receiving system
6 object
8 illumination arrangement
10 code reader
12 optical head
14 light emergence surface
16 light optical head
18 attachment
20 sensor matrix
22 optical receiving system
24 board
26 LEDs
28 object
30 optical axis
32 opening
34 inner surfaces
36 light emergence surface
38 light waveguides
40 holding plate
42 holding element
44 shadowing element
46 light source
48 lenses
50 diaphragms

What is claimed is:

1. A code reader, comprising an integrated light source for illuminating a reading zone, a sensor matrix and an optical receiving system positioned in front of the sensor matrix latter, wherein a light emergence surface of the light source is located in one of a depth of field zone and closely in front of the depth of field zone of the optical receiving system; and wherein the light source includes an arrangement of a plurality of LEDs which are arranged around an optical axis of the optical receiving system and is located in a region of the optical receiving system and of the sensor matrix, with light directing elements made as separate light waveguides and being arranged between the plurality of LEDs and the light emergence surface such that each LED is associated with a separate light waveguide.

2. A code reader in accordance with claim 1, wherein the light emergence surface extends substantially parallel to an optical axis of the optical receiving system.

3. A code reader in accordance with claim 1, wherein an attachment is provided which can be detached from the remaining code reader components and includes the light emergence surface.

4. A code reader in accordance with claim 1, wherein at least one of lenses and diaphragms are associated with the LEDs for generating a radiation directed in the direction of the light directing elements with in particular a respective lens or a respective diaphragm and a respective ring reflector being associated with each LED.

5. A code reader in accordance with claim 1, wherein the light source, which in particular consists of an arrangement of a plurality of LEDs, including the light emergence surface, is located in or close to the depth of field zone of the optical receiving system.

6. A code reader in accordance with claim 5, wherein the light source, together with the light emergence surface associated with the light source, is provided in an attachment detachable from the remaining code reader components.

7. A code reader in accordance with claim 1, wherein the light source and the optical receiving system are accommodated in an optical head which is adjustable in different positions relative to the remaining code reader components.

8. A code reader, comprising an integrated light source for illuminating a reading zone, a sensor matrix and an optical receiving system positioned in front of the sensor matrix, wherein a light emergence surface of the light source is located in one of a depth of field zone and closely in front of the depth of field zone of the optical receiving system and the light source includes an arrangement of a plurality of LEDs which are arranged around an optical axis of the optical receiving system and each LED is associated with at least one of a lens, a diaphragm or a ring reflector for generating a radiation directed in the direction of light directing elements arranged between the light source and the light emergence surface.

9. A code reader in accordance with claim 8, wherein the light emergence surface extends substantially parallel to an optical axis of the optical receiving system.

10. A code reader in accordance with claim 8, wherein an attachment is provided which can be detached from the remaining code reader components and includes the light emergence surface.

11. A code reader in accordance with claim 8, wherein the light source is located in a region of the optical receiving system and of the sensor matrix, with light directing elements being arranged between the light source and the light emergence surface.

12. A code reader in accordance with claim 11, wherein the light directing elements are made as light waveguides and as an arrangement of reflecting surfaces.

13. A code reader, comprising an integrated light source for illuminating a reading zone, a sensor matrix and an optical receiving system positioned in front of the sensor matrix, wherein the light source and a light emergence surface of the light source is located in one of a depth of field zone and closely in front of the depth of field zone of the optical receiving system; wherein the light source, together with the light emergence surface associated with the light source, is provided in an attachment detachable from the remaining code reader components.

14. A code reader in accordance with claim 13, wherein the light emergence surface extends substantially parallel to an optical axis of the optical receiving system.

15. A code reader in accordance with claim 13, wherein an attachment is provided which can be detached from the remaining code reader components and includes the light emergence surface.

16. A code reader in accordance with claim 13, wherein the light source is located in a region of the optical receiving system and of the sensor matrix, with light directing elements being arranged between the light source and the light emergence surface.

17. A code reader in accordance with claim 16, wherein the light directing elements are made as light waveguides and as an arrangement of reflecting surfaces.

18. A code reader in accordance with claim 13, wherein the light source includes an arrangement of a plurality of LEDs which are arranged around an optical axis of the optical receiving system.

19. A code reader in accordance with claim 18, wherein at least one of lenses and diaphragms are associated with the LEDs for generating a radiation directed in the direction of the light directing elements, with in particular a respective lens or a respective diaphragm and a respective ring reflector being associated with each LED.

* * * * *